United States Patent
Lu et al.

(10) Patent No.: US 12,341,195 B2
(45) Date of Patent: *Jun. 24, 2025

(54) CONDUCTING POLYMER NETWORK-PROTECTED PHOSPHORUS ANODE ACTIVE MATERIAL FOR LITHIUM-ION OR SODIUM-ION BATTERIES

(71) Applicant: Honeycomb Battery Company, Dayton, OH (US)

(72) Inventors: Sheng-Yi Lu, Taipei (TW); Bor Z. Jang, Centerville, OH (US)

(73) Assignee: Honeycomb Battery Company, Dayton, OH (US)

( * ) Notice: Subject to any disclaimer, the term of this patent is extended or adjusted under 35 U.S.C. 154(b) by 199 days.

This patent is subject to a terminal disclaimer.

(21) Appl. No.: 16/869,279

(22) Filed: May 7, 2020

(65) Prior Publication Data
US 2021/0351409 A1    Nov. 11, 2021

(51) Int. Cl.
H01M 4/38       (2006.01)
H01M 4/04       (2006.01)
H01M 4/60       (2006.01)
H01M 10/0525    (2010.01)
H01M 10/36      (2010.01)

(52) U.S. Cl.
CPC .......... H01M 4/604 (2013.01); H01M 4/0411 (2013.01); H01M 4/0419 (2013.01); H01M 4/0426 (2013.01); H01M 4/0428 (2013.01); H01M 4/38 (2013.01); H01M 4/608 (2013.01);

(Continued)

(58) Field of Classification Search
CPC .. H01M 4/604; H01M 4/0411; H01M 4/0419; H01M 4/0426; H01M 4/0428; H01M 4/38; H01M 4/608; H01M 10/0525; H01M 10/36
See application file for complete search history.

(56) References Cited

U.S. PATENT DOCUMENTS 7,071,258 B1     7/2006  Jang et al.
8,632,698 B2 *   1/2014  Kim ..................... H01M 4/366
                                                   252/518.1

(Continued)

OTHER PUBLICATIONS

Chen et al., "Scalable Clean Exfoliation of High-Quality Few-Layer Black Phosphorus for a Flexible Lithium Ion Battery" Advanced Materials (2016) vol. 28, pp. 510-517.

(Continued)

*Primary Examiner* — James Lee

(57) ABSTRACT

Provided is conducting network polymer-encapsulated phosphorus-based anode particulate or multiple particulates for a lithium or sodium ion battery, the particulate comprising: (A) a core comprising one or a plurality of phosphorus material particles or coating (e.g. on surfaces of graphitic material particles) having a diameter or thickness from 0.5 nm to 10 μm and is selected from red phosphorus, black phosphorus (including phosphorene), violet phosphorus, a metal phosphide, $MP_y$, or a combination thereof, wherein M=Mn, V, Sn, Ni, Cu, Fe, Co, Zn, Ge, Se, Mo, Ga, In, or an alloy thereof, and y=1-4; and (B) an encapsulating shell that embraces or encapsulates the core, wherein the encapsulating shell comprises an electron- and/or ion-conducting network (cross-linked) polymer.

23 Claims, 9 Drawing Sheets

(52) U.S. Cl.
CPC ....... *H01M 10/0525* (2013.01); *H01M 10/36* (2013.01)

(56) References Cited

U.S. PATENT DOCUMENTS

| | | | | |
|---|---|---|---|---|
| 2005/0095504 | A1* | 5/2005 | Kim | H01M 50/46 429/246 |
| 2005/0271574 | A1 | 12/2005 | Jang et al. | |
| 2008/0048152 | A1 | 2/2008 | Jang et al. | |
| 2014/0315081 | A1* | 10/2014 | Zhang | H01M 4/366 427/560 |
| 2015/0044565 | A1* | 2/2015 | Wang | H01M 4/387 429/231.1 |
| 2016/0172676 | A1* | 6/2016 | Young | H01M 4/366 429/218.2 |
| 2016/0260966 | A1* | 9/2016 | Ohsawa | H01M 4/625 |
| 2017/0047584 | A1* | 2/2017 | Hwang | H01M 4/625 |
| 2017/0288211 | A1* | 10/2017 | Zhamu | H01M 4/62 |
| 2018/0069230 | A1* | 3/2018 | Lee | H01M 4/1395 |
| 2018/0241032 | A1* | 8/2018 | Pan | H01M 4/62 |
| 2019/0051902 | A1* | 2/2019 | Zhamu | H01M 10/056 |
| 2020/0235420 | A1* | 7/2020 | Yushin | H01M 10/0565 |

OTHER PUBLICATIONS

Ding et al., "Phosphorus nanoparticles combined with cubic boron nitride and graphene as stable sodium-ion battery anodes" Electrochimica Acta (2017) vol. 235, pp. 150-157.

Hummers et al., "Preparation of graphitic oxide" J. Am. Chem. Soc. (1958) vol. 80, p. 1339.

Karlicky et al., "Halogenated Graphenes: Rapidly Growing Family of Graphene Derivatives" ACS Nano (2013) vol. 7, No. 8, pp. 6434-6464.

Lee et al., "Reduced Graphene Oxide-Encapsulated Phosphorus/Carbon Composite as a Promising Anode Material for High-Performance Sodium-Ion Batteries" J. Materials Chemistry A (2017) DOI: 10.1039/C6TA09967J.

Liu et al., "Red Phosphorus Nanodots on Reduced Graphene Oxide as a Flexible and Ultra-Fast Anode for Sodium-ion Batteries" ACS Nano (2017) vol. 11, pp. 5530-5537.

Ma et al., "Phosphorus and Nitrogen Dual-Doped Few-Layered Porous Graphene: A High-Performance Anode Material for Lithium-Ion Batteries" ACS Appl. Mater. Interfaces (2014) vol. 6, pp. 14415-14422.

Pei et al., "Phosphorus Nanoparticles Encapsulated in Graphene Scrolls as a High-Performance Anode for Sodium-Ion Batteries" ChemElectroChem Communications ChemPubSoc Europe (2015) DOI: 10.1002/celc.201500251.

Song et al., Chemically Bonded Phosphorus/Graphene Hybrid as a High Performance Anode for Sodium-Ion Batteries NanoLetters (2014) vol. 14, No. 11, pp. 6329-6335.

Sun et al., "A phosphorene-graphene hybrid material as a high-capacity anode for sodium-ion batteries" Nature Nanotechnology (2015) vol. 10, pp. 980-986.

Yu et al., "Phosphorus-Graphene Nanosheet Hybrids as Lithium-Ion Anode with Exceptional High-Temperature Cycling Stability" Adv. Sci. (2015) DOI: 10.1002/advs.201400020.

Yue et al., "Utilizing a graphene matrix to overcome the intrinsic limitations of red phosphorus as an anode material in lithium-ion batteries" Carbon (2018) vol. 127, pp. 588-595.

Zhang et al., "Amorphous Phosphorus/Nitrogen-Doped Graphene Paper for Ultrastable Sodium-Ion Batteries" NanoLett. (2016) vol. 16, No. 3, pp. 2054-2060.

Zhang et al., "An Air-Stable Densely Packed Phosphorene-Graphene Composite Toward Advanced Lithium Storage Properties" Advanced Energy Materials (2016) vol. 6, p. 1600453.

Zhang et al., "Wet-Chemical Processing of Phosphorus Composite Nanosheets for High-Rate and High-Capacity Lithium-Ion Batteries" Advanced Energy Materials (2016) vol. 6, p. 1502409.

* cited by examiner

CONDUCTING POLYMER NETWORK-PROTECTED PHOSPHORUS ANODE ACTIVE MATERIAL FOR LITHIUM-ION OR SODIUM-ION BATTERIES

The present disclosure relates generally to the fields of lithium-ion batteries and sodium-ion batteries and, in particular, to a conducting polymer network-encapsulated phosphorus (P) particles or coating as an anode active material for a lithium-ion battery or sodium-ion battery.

BACKGROUND

Next generation lithium-ion batteries (LIBs) are a prime candidate for energy storage devices within aircraft, electric vehicles (EVs), drones, renewable energy storage, and smart grid applications. Graphite materials have been widely used as an anode active material for commercial LIBs due to their relatively low cost and excellent reversibility. However, the theoretical lithium storage capacity of graphite is only 372 mAh/g (based on $LiC_6$), which limits the total capacity and energy density of a battery. The emerging EV and renewable energy industries demand the availability of rechargeable batteries with a significantly higher energy and power density than what current LIB technology can provide. This requirement has triggered considerable research efforts on the development of electrode materials with higher specific capacity (e.g. Si and P), excellent rate capability, and good cycle stability for LIBs.

Sodium ion batteries (NIBs) have been recognized as the most attractive alternative to the current lithium-ion batteries (LIBs) owing to the natural abundance of sodium. Unfortunately, the low energy density, inferior power density and poor cycle life are still the main issues for NIBs that have prevented NIBs from successful commercialization. The current preferred choice for sodium-ion anode material is hard carbon, which was shown to deliver a specific capacity of 300 mAh/g. The alternative NIB anode materials being considered include Si, Sn, P, and metal oxides/sulfides/selenides.

The primary barriers against more widespread acceptance of battery-powered EVs by consumers are that the EV batteries are still too expensive and too heavy. For instance, a well-known all-electric vehicle manufactured in the US operates on an 85 kilo-watt-hour lithium battery system that can run for 320 miles on one battery charge. However, the battery system weights almost 700 Kgs, occupies the entire chassis of a car, and costs about $15,000 (battery system alone). This battery cost is equivalent to approximately $175/kWh. The US Department of Energy and industry experts believe that the EV industry cannot be economically viable unless the battery cost goes below $100/kWh. Other worldwide government agencies also mandate that the near-term energy density target of an EV battery must exceed 350 Wh/kg, as opposed to the current 250 Wh/kg.

One potential solution to these two closely related problems of current EV battery cells is to significantly increase the specific capacity (mAh/g) or volumetric energy density (mAh/L) of both the anode and cathode active materials with a minimal increase in cost. As shown in FIG. 1(A)-FIG. 1(C), the element Si has the highest specific capacity (3,850-4,000 mAh/g) for lithium ion storage; phosphorus (P) has a Li storage capacity of 2500 mAh/g. However, phosphorus (P) can store more Li ions per unit volume (2300 $mAh/cm^3$) vs. 2280 $mAh/cm^3$ of Si. More significantly, P has the highest sodium storage capacity (2596 mAh/g) vs. 950 mAh/g of Si. These theoretical data suggest that P is at least as good as Si as a high-capacity anode material for both LIB s and NIB s.

However, P suffers from several severe problems, including poor first-cycle efficiency, rapid capacity decay, and poor electrode integrity. Presumably, these problems stem from the poor electronic conductivity ($1\times10^{-14}$ S/cm), low Li or Na ion diffusivity and conversion rates, and large volume expansion (about 100%) during cycling. The poor conductivity and low ion diffusivity imply the need for a large amount of conductive additive and poor P utilization efficiency. Repeated volume expansion/shrinkage can lead to repeated formation and destruction of SEI (particularly in a NIB and, hence, continued consumption of Na ions and electrolyte), low Coulomb efficiency, fragmentation of P particles, break-away of P particles from the resin binder, and electrode expansion and delamination. All these phenomena could contribute to fast capacity decay.

Graphene, as a two-dimensional carbon material, exhibits high electric and thermal conductivity, high surface area (theoretically 2630 $m^2/g$), high mechanical flexibility and strength, and good chemical compatibility relative to intended electrode materials and electrolyte. Some attempts have been made to use these excellent properties to help address the fast decay issues of phosphorus-based anode active materials. The following list of references summarizes prior art efforts to use graphene as a supporting material:

LIST OF REFERENCES

1. J. X. Song, et al. (D. H. Wang group), Chemically bonded phosphorus/graphene hybrid as a high performance anode for sodium-ion batteries, Nano Lett. 14 (2014) 6329-6335.
2. L. K. Pei, et al. Phosphorus nanoparticles encapsulated in graphene scrolls as a high-performance anode for sodium-ion batteries, ChemElectroChem 2 (2015) 1652-1655.
3. C. Zhang, et al., Amorphous phosphorus/nitrogen-doped graphene paper for ultrastable sodium-ion batteries, Nano Lett. 16 (2016) 2054-2060.
4. Y. H. Liu, et al. Red phosphorus nanodots on reduced graphene oxide as a flexible and ultra-fast anode for sodium-ion batteries, ACS Nano 11 (2017) 5530-5537.
5. X. L. Ding, et al., Phosphorus nanoparticles combined with cubic boron nitride and graphene as stable sodium ion battery anodes, Electrochim. Acta 235 (2017) 150-157.
6. G. H. Lee, et al., A reduced graphene oxide-encapsulated phosphorus/carbon composite as a promising anode material for high-performance sodium-ion batteries, J. Mater. Chem. A 5 (2017) 3683-3690.
7. J. Sun, et al. (Y. Cui group), A phosphorene-graphene hybrid material as a high-capacity anode for sodium-ion batteries, Nat. Nanotechnol. 10 (2015) 980-986.
8. Y. Zhang, et al., An air-stable densely packed phosphorene graphene composite toward advanced lithium storage properties, Adv. Energy Mater. 6 (2016) 1600453.
9. Z. X. Yu, (D. H. Wang group), Phosphorus graphene nanosheet hybrids as lithium-ion anode with exceptional high-temperature cycling stability, Adv. Sci. 2 (2015) 1400020.
10. L. Chen, et al. (H. M. Cheng group), Scalable clean exfoliation of high-quality few-layer black phosphorus for a flexible lithium ion battery, Adv. Mater. 28 (2016) 510-517.

11. Y. Y. Zhang, et al., Wet-chemical processing of phosphorus composite nanosheets for high-rate and High-capacity lithium-ion batteries, Adv. Energy Mater. (2016) 1502409.
12. X. Ma, et al. Phosphorus and Nitrogen Dual-Doped Few-Layered Porous Graphene: A High-Performance Anode Material for Lithium-Ion Batteries. ACS Appl. Mater. Interfaces 2014, 6, 14415-14422.
13. Zishuang Yue, et al., "Utilizing a graphene matrix to overcome the intrinsic limitations of red phosphorus as an anode material in lithium-ion batteries," Carbon, V. 127, February 2018, P588-595.

These previous studies have provided some hints about the roles of graphene in improving the performance of P-based anode materials. However, these earlier approaches have fallen short in solving the problems, such as low first-cycle efficiency (11%-61%, meaning at least 39% of the Li or sodium ions originally stored in the cathode is lost after first charge/discharge cycle) and fast capacity decay. We believe that the problem of fast capacity decay in a NIB is caused by repeated formation and destruction of solid-electrolyte interphase (SEI) and other undesirable chemical reactions (hence, consuming electrolyte and ions) during charge/discharge cycling. As the volume of the anode active material and the electrode expand and shrink during cycling, the SEI film which is initially formed on anode material surfaces gets broken, and the fresh surface of anode is exposed to electrolyte, eventually consuming additional $Na^+$ ions and electrolyte to make new SEI film. This new SEI film is destructed again during the next charge/discharge cycle. These repeated reactions result in low coulombic efficiency and continuing capacity deterioration.

SUMMARY

The prior art has not demonstrated a phosphorus material system that has all or most of the properties desired for use as an anode active material in a lithium-ion battery or sodium-ion battery. Thus, there is an urgent and continuing need for a new anode active material that enables a lithium-ion battery to exhibit a high cycle life, high reversible capacity, low irreversible capacity, small particle sizes (for high-rate capacity), and compatibility with commonly used electrolytes. There is also a need for a method of readily or easily producing such a material in large quantities.

Thus, it is a specific object of the present disclosure to meet these needs and address the issues associated the rapid capacity decay of a lithium-ion or sodium-ion battery containing a phosphorus-based high-capacity anode active material.

The present disclosure provides a conducting polymer network-encapsulated phosphorus-based anode particulate (or multiple particulates) for a lithium-ion battery (LIB) or sodium ion battery (NIB). In certain embodiments, the particulate comprises: (A) a core comprising a phosphorus material in a form of particles or coating having a diameter or thickness from 0.5 nm to 10 μm (preferably from 0.5 nm to 1 μm and most desirably from 1 nm to 100 nm) and is selected from red phosphorus, black phosphorus, violet phosphorus, a metal phosphide, MPy, or a combination thereof, wherein M=Mn, V, Sn, Ni, Cu, Fe, Co, Zn, Ge, Se, Mo, Ga, In, or an alloy thereof, and y=1, 2, 3, 4; and (B) an encapsulating shell that embraces or encapsulates the core, wherein the encapsulating shell comprises an electron-conducting or ion-conducting network (cross-linked) polymer, preferably having a thickness from 0.5 nm to 10 μm. The proportion of conducting network polymer in the entire particulate is typically from 0.01% to 30% by weight, but preferably from 0.1% to 20% by weight, and more preferably from 0.1% to 10% by weight.

The phosphorus material as the anode active material (responsible for storing and releasing sodium ions or lithium ions) is preferably from 30% to 99.9% (more preferably at least 50%, further preferably at least 70%, even more preferably at least 80%, further more preferably at least 90% and most preferably at least 95%) by weight of the total composite particulate weight. The higher the P material proportion, the higher is the specific energy or volumetric energy density of the resulting LIB or NIB.

The network polymer or polymer network refers to a group of cross-linked polymers each containing electron-conducting and/or ion-conducting polymer chains that are cross-linked together to form a substantially 3D network of polymer chains (as opposed to just linear or branched chains). When impregnated or soaked with a liquid (e.g. organic solvent, ionic liquid, or water), the polymer network can get swollen and can become a polymer gel. Typically, upon removal of the liquid, the polymer network can recover its original dimension.

Preferably, the electrically conducting polymer gel network contains chains of a conjugated polymer selected from Polyacetylene, Polythiophene, Poly(3-alkylthiophenes), Polypyrrole, Polyaniline, Poly(isothianaphthene), Poly(3,4-ethylenedioxythiophene) (PEDOT), alkoxy-substituted Poly (p-phenylene vinylene), Poly(2,5-bis(cholestanoxy) phenylene vinylene), Poly(p-phenylene vinylene), Poly(2,5-dialkoxy) paraphenylene vinylene, Poly[(1,4-phenylene-1, 2-diphenylvinylene)], Poly(3',7'-dimethyloctyloxy phenylene vinylene), Polyparaphenylene, Polyparaphenylene, Polyparaphenylene sulfide, Polyheptadiyne, Poly(3-hexylthiophene), Poly(3-octylthiophene), Poly(3-cyclohexylthiophene), Poly(3-methyl-4-cyclohexylthiophene), Poly (2,5-dialkoxy-1,4-phenyleneethynylene), Poly(2-decyloxy-1,4-phenylene), Poly(9,9-dioctylfluorene), Polyquinoline, a derivative thereof, a copolymer thereof, a sulfonated version thereof, or a combination thereof.

In some preferred embodiments, the conducting polymer gel network comprises a polyaniline hydrogel, polypyrrole hydrogel, or polythiophene hydrogel in a substantially dehydrated state. Such a conducting polymer gel network is typically a lightly crosslinked polymer, having a high elasticity (high elastic deformation that is recoverable).

In some embodiments, the ionically conducting polymer network comprises chains of a polymer selected from poly (ethylene oxide), polypropylene oxide, poly(ethylene glycol), poly(acrylonitrile), poly(methyl methacrylate), poly (vinylidene fluoride), poly bis-methoxy ethoxyethoxide-phosphazenex, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol) methyl ether acrylate, a sulfonated derivative thereof, or a combination thereof.

The core of the anode particulate may further comprise an electrically and/or ionically conducting polymer network that is identical to or different from the electrically and/or ionically conducting polymer network in the encapsulating shell.

The core may further comprise a conductive additive, such as a carbon, graphitic material, graphene, or polymer (electron-conducting or ion-conducting polymer that is linear, branched, or cross-linked). The carbon or graphitic material may be selected from particles of carbon black, acetylene black, amorphous carbon, carbon nano-tube (CNT), carbon nano-fiber (CNF), activated carbon, expanded graphite flakes, micro-crystalline graphite, etc. The amount of this conductive additive is preferably less than 30% by weight, more preferably less than 20%, further more preferably less than 10% by weight based on the total composite particulate weight.

In some embodiments, the phosphorus material in the core is bonded to surfaces of the (internal) graphene sheets in the core with a carbon or an electron-conducting polymer. The electron-conducting polymer (linear, branched, or cross-linked) may contain a conjugated polymer selected from Polyacetylene, Polythiophene, Poly(3-alkylthiophenes), Polypyrrole, Polyaniline, Poly(isothianaphthene), Poly(3,4-ethylenedioxythiophene), alkoxy-substituted Poly (p-phenylene vinylene), Poly(2,5-bis(cholestanoxy) phenylene vinylene), Poly(p-phenylene vinylene), Poly(2,5-dialkoxy) paraphenylene vinylene, Poly[(1,4-phenylene-1,2-diphenylvinylene)], Poly(3',7'-dimethyloctyloxy phenylene vinylene), Polyparaphenylene, Polyparaphenylene, Polyparaphenylene sulfide, Polyheptadiyne, Poly(3-hexylthiophene), Poly(3-octylthiophene), Poly(3-cyclohexylthiophene), Poly(3-methyl-4-cyclohexylthiophene), Poly(2,5-dialkoxy-1,4-phenyleneethynylene), Poly(2-decyloxy-1,4-phenylene), Poly(9,9-dioctylfluorene), Polyquinoline, a derivative thereof, a copolymer thereof, or a combination thereof. The electron-conducting polymer in the core may partially or fully cover or encapsulate the phosphorus material (in a form of coating or minute particles).

In certain embodiments, the encapsulating shell of an ion-conducting or electron-conducting material seals off the shell to prevent the direct contact of the phosphorus material in the core with a liquid electrolyte in the lithium-ion battery or sodium-ion battery.

The encapsulating shell may or may not contain any graphene sheets dispersed in the conducting polymer network.

The graphene sheets, if present in the core or in the shell, preferably contain single-layer or few-layer graphene, wherein the few-layer graphene sheets have 2-10 layers of stacked graphene planes having an inter-plane spacing $d_{002}$ from 0.3354 nm to 0.6 nm as measured by X-ray diffraction and the single-layer or few-layer graphene sheets contain a pristine graphene material having essentially zero % of non-carbon elements, or a non-pristine graphene material having 0.001% to 25% by weight of non-carbon elements. The non-pristine graphene may be selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

In the anode particulate disclosed, the core may preferably further comprise a single pore or a plurality of pores to accommodate the volume expansion of the phosphorus material when the lithium-ion battery or sodium-ion battery is charged. In some preferred embodiments, the phosphorus material inside the core has a volume $V_1$ and the pore or pores have a total volume $V_2$, wherein the $V_2/V_1$ ratio is from 0.5 to 3.5.

The core may further comprise an electron-conducting material selected from a carbon, pitch, carbonized resin, conductive polymer, conductive organic material, metal, metal oxide, expanded graphite, graphene, or a combination thereof.

In some embodiments, the core further comprises a lithium or sodium ion-conducting material. The lithium or sodium ion-conducting material may be selected from amorphous carbon, an ion-conducting polymer, an ion-conducting polymer gel, an inorganic solid electrolyte, or a combination thereof. The ion-conducting polymer preferably comprises a non-crosslinked polymer selected from poly (ethylene oxide), polypropylene oxide, poly(ethylene glycol), poly(acrylonitrile), poly(methyl methacrylate), poly (vinylidene fluoride), poly bis-methoxy ethoxyethoxide-phosphazenex, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol) methyl ether acrylate, a sulfonated derivative thereof, or a combination thereof.

In some embodiments, the phosphorous material particles are porous having surface pores, internal pores, or both surface and internal pores. The phosphorus material particles, porous or non-porous, may include nano particles selected from nano flakes, beads, pellets, spheres, wires, fibers, filaments, discs, ribbons, or rods, having a diameter or thickness from 1 nm to 100 nm.

In some embodiments, the phosphorus material particles comprise phosphorene, which contains mono-layer or few-layer 2D platelets of black phosphorus.

The disclosure also provides a powder mass comprising multiple anode particulates as described in the foregoing. The disclosure further provides an anode electrode comprising multiple anode particulates as herein disclosed as an anode material.

The disclosure also provides a lithium-ion battery comprising such an anode electrode, a cathode, and an electrolyte. Also provided is a sodium-ion battery, comprising such an anode electrode, a cathode, and an electrolyte.

The disclosure further provides a process for producing multiple anode particulates as defined in the foregoing, wherein the process comprises: (A) dispersing multiple particles or coating of the phosphorus material in a reacting mass comprising an oligomer or a monomer, an initiator or catalyst, and a curing or cross-linking agent to form a reacting slurry; (B) forming the reacting slurry into multiple reacting droplets, wherein the droplet comprises one or a plurality of particles of the phosphorus material dispersed in a matrix of polymerizing or cross-linking chains; and (C) converting the polymerizing or cross-linking chains into a network polymer in the droplets to form the anode particulates.

Step (B) of forming reacting droplets may comprise operating a procedure selected from pan-coating, air-suspension coating, centrifugal extrusion, vibration-nozzle encapsulation, spray-drying, coacervation-phase separation, interfacial polycondensation or interfacial cross-linking, in-situ polymerization, matrix polymerization, or a combination thereof In certain embodiments, the process further comprises thermally vaporizing the phosphorus material and re-distributing the phosphorus material vapor in the core, making (e.g. via cooling) the vapor to deposit as a coating or nano particles of the phosphorus material supported on surfaces of the internal graphene sheets or other ingredients.

In some embodiments, step (A) of combining comprises a procedure of depositing phosphorus material onto graphene surfaces (when present) to produce phosphorus material-decorated graphene sheets, containing phosphorus particles or coating, phosphorene platelets, or metal phosphide particles or coating bonded on graphene surfaces. These phosphorus material-decorated graphene sheets are then dispersed in the liquid medium, along with carbon particles (if present), to form the suspension.

Prior to step (A), the phosphorus material may have been already deposited on surfaces of graphene sheets, graphite flakes, carbon nanotubes, carbon nano-fibers, etc. The procedure of depositing phosphorus material onto graphene surfaces may comprise operating physical vapor deposition, chemical vapor deposition, sputtering, plasma-enhanced deposition, solution phase deposition, chemical deposition, electrochemical deposition, thermal spraying, ultrasonic spraying, electrostatic deposition, electrophoretic deposition, laser ablation deposition, or a combination thereof.

DETAILED DESCRIPTION OF PREFERRED EMBODIMENTS

A lithium-ion battery or sodium-ion battery cell is typically composed of an anode current collector (e.g. Cu foil), an anode or negative electrode active material layer (i.e. anode layer typically containing particles of an anode active material, conductive additive, and binder), a porous separator and/or an electrolyte component, a cathode or positive electrode active material layer (containing a cathode active material, conductive additive, and resin binder), and a cathode current collector (e.g. Al foil). More specifically, the anode layer is composed of particles of an anode active material (e.g. graphite, hard carbon, Sn, SnO$_2$, Si, or P), a conductive additive (e.g. carbon black particles), and a resin binder (e.g. SBR or PVDF). This anode layer is typically 50-300 μm thick (more typically 100-200 μm) to give rise to a sufficient amount of current per unit electrode area.

Figure 1A:
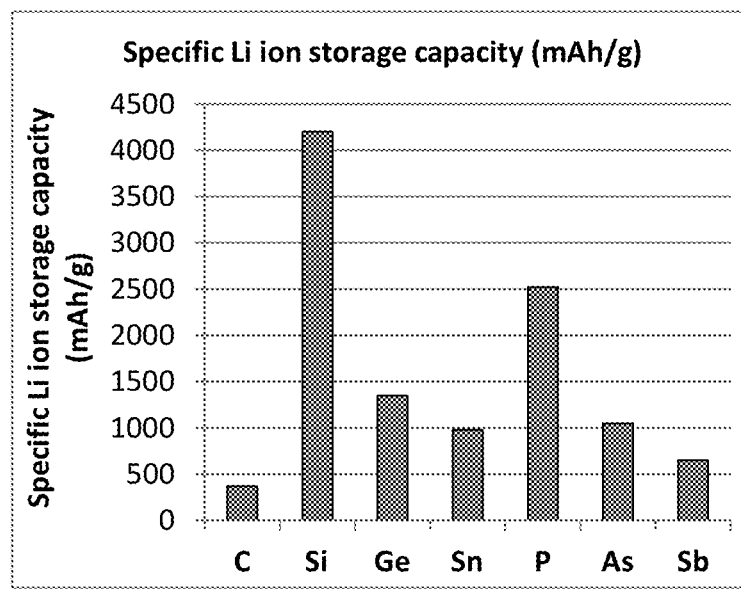
FIG. 1(A) The specific lithium ion storage capacity values (mAh/g) of select anode active materials (elements)
Figure 1B:
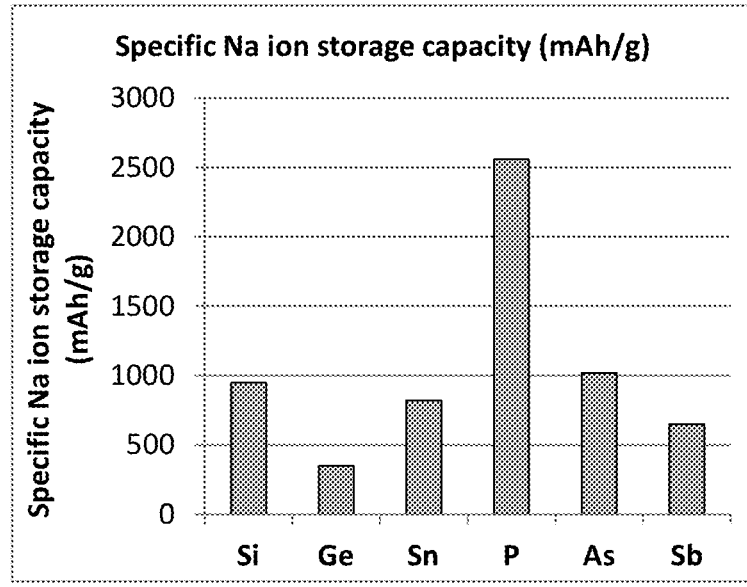
FIG. 1(B) The specific sodium ion storage capacity values (mAh/g) of select anode active materials.
Figure 1C:
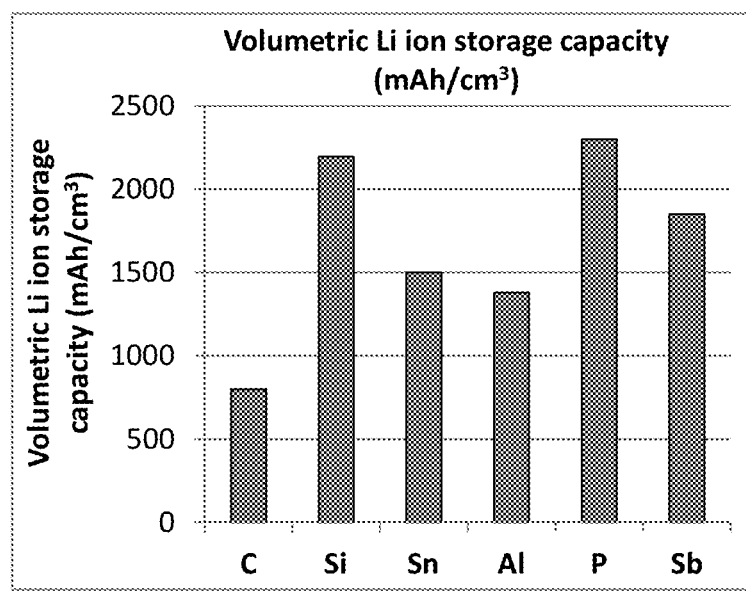
FIG. 1(C) The volumetric lithium ion storage capacity values (mAh/cm$^3$) of select anode active materials.

In order to obtain a higher energy density cell, the anode can be designed to contain higher-capacity anode active materials having a composition formula of Li$_a$A for Li-ion cells (wherein A is a metal or semiconductor element, such as Al and Si, and "a" satisfies 0<a≤5). These materials are of great interest due to their high theoretical capacity, e.g., Li$_4$Si (3,829 mAh/g), Li$_{44}$Si (4,200 mAh/g), Li$_{44}$Ge (1,623 mAh/g), Li$_{44}$Sn (993 mAh/g), Li$_3$Cd (715 mAh/g), Li$_3$Sb (660 mAh/g), Li$_{44}$Pb (569 mAh/g), LiZn (410 mAh/g), and Li$_3$Bi (385 mAh/g). The specific lithium ion storage capacity and sodium ion capacity values of select anode active materials are illustrated in FIG. 1(A) and FIG. 1(B) and the volumetric lithium ion storage capacity values of select elements are presented in FIG. 1(C).

However, as discussed in the Background section, there are several problems associated with the implementation of these high-capacity anode active materials:

1) In an anode composed of these high-capacity materials, severe pulverization (fragmentation of the particles) occurs during the charge and discharge cycles due to severe expansion and contraction of the anode active material particles induced by the insertion and extraction of the lithium or sodium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

2) The approach of using a composite composed of small electrode active particles protected by (dispersed in or encapsulated by) a less active or non-active matrix, e.g., carbon-coated P or Si particles, has failed to overcome the capacity decay problem. Presumably, the protective matrix can provide a cushioning effect for particle expansion or shrinkage, and prevent the electrolyte from contacting and reacting with the electrode active material. Unfortunately, when an active material particle, such as P particle, expands (e.g. up to a volume expansion of 300%) during the battery charge step, the protective coating is easily broken due to the mechanical weakness and/or brittleness of the protective coating materials. There has been no high-strength and high-toughness material available that is itself also lithium ion conductive.

3) The approach of using a conventional core-shell structure (e.g. a P nano particle encapsulated in a carbon shell) also has not solved the capacity decay issue. A P particle can be encapsulated by a carbon shell to form a core-shell structure (e.g. P core and carbon shell). As the lithium-ion battery is charged, the anode active material (carbon-encapsulated P particle) is intercalated with lithium or sodium ions and, hence, the P particle expands. Due to the brittleness of the encapsulating shell (carbon), the shell is broken into segments, exposing the underlying P to electrolyte and subjecting the P to undesirable reactions with electrolyte during repeated charges/discharges of the battery.

These reactions continue to consume the electrolyte and reduce the cell's ability to store lithium or sodium ions.

In other words, there are several conflicting factors that must be considered concurrently when it comes to the design and selection of an anode active material in terms of material type, shape, size, porosity, and electrode layer thickness. Thus far, there has been no effective solution offered by any prior art teaching to these conflicting problems. We have solved these challenging issues that have troubled battery designers and electrochemists alike for more than 30 years by developing the approach of conducting network polymer-encapsulated porous particulates (secondary particles preferably in a substantially core-shell structure). The disclosed core-shell particulate comprises a core and a shell encapsulating the core, wherein the core comprises one or multiple primary particles of an anode active material (i.e. a phosphorus material) and optional internal graphene sheets (or other carbonaceous or graphitic nano materials) residing in a porous core. The phosphorus material, in the form of nano particles, phosphorene platelets, or coating, may be deposited on surfaces of the internal graphene sheets. The pores in the core can accommodate the volume expansion of the primary particle(s) of the phosphorus material. The encapsulating shell, comprising a conducting polymer network, encapsulates the porous core. The encapsulating shell may or may not contain any graphitic material (e.g. graphene sheets) dispersed in the conducting network polymer.

In certain embodiments, the present disclosure provides an anode particulate (or multiple particulates), featuring a conducting polymer network-encapsulated phosphorus, for a lithium battery or sodium ion battery. As schematically illustrated in FIG. 2(B), the particulate comprises: (A) a core comprising one or a plurality of phosphorus material particles or coating (optionally deposited on surfaces of graphene sheets), wherein the supporting graphene sheets, if present, have a length or width from 5 nm to 100 μm and contain single-layer or few-layer graphene sheets and the phosphorus material is in a form of particles or coating having a diameter or thickness from 0.5 nm to 10 μm (preferably <100 nm) and is selected from red phosphorus, black phosphorus, violet phosphorus, a metal phosphide, MPy, or a combination thereof, wherein M=Mn, V, Sn, Ni, Cu, Fe, Co, Zn, Ge, Se, Mo, Ga, In, or an alloy thereof, and y is from 1 to 4; and (B) an encapsulating shell that embraces or encapsulates the core, wherein the encapsulating shell comprises a conducting polymer network, preferably having a thickness from 0.5 nm to 10 μm.

The general reactions of phosphorus with lithium/sodium may be summarized as follows:

$$P + xLi^+/Na^+ + xe^- \leftrightarrow Li_xP/Na_xP \quad (1)$$

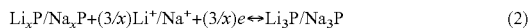

$$Li_xP/Na_xP + (3/x)Li^+/Na^+ + (3/x)e^- \leftrightarrow Li_3P/Na_3P \quad (2)$$

During the lithiation/sodiation process, phosphorus reacts with lithium/sodium to form the intermediate compounds of $Li_xP/Na_xP$, with the final products of $Li_3P/Na_3P$. The delithiation/desodiation process involves a stepwise lithium/sodium ion extraction from the fully lithiated/sodiatied $Li_3P/Na_3P$, corresponding to several plateaus in the voltage profile, as well as the several cathodic peaks in the cyclic voltammogram.

The ion storing mechanism of metal phosphides, MPy (M=Mn, V, Sn, Ni, Cu, Fe, Co, Zn, Ge, Se, Mo, Ga, In; y=1-4), may be categorized according to the features of the metal and the metal-phosphorus bond stability when reacted with Li or Na. The mechanisms may be divided into the following two categories.

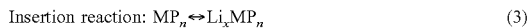

$$\text{Insertion reaction: } MP_n \leftrightarrow Li_xMP_n \quad (3)$$

$$\text{Conversion reaction: } MP_n \leftrightarrow M(Li_xM) + Li_xP \quad (4)$$

When the metal phosphides have stable crystalline structures, $Li_xMP_y$ is formed through the insertion reaction mechanism. However, the structures of phosphides typically collapse within a few insertions/extractions, or full discharge/charge reactions through the conversion reaction mechanisms, providing nanosized $Li_3P$ and $M(Li_xM)$, with bonds between metal and phosphorus broken. The conversion reaction produced nano-crystallites with less severe structural stress. The redox nature of the phosphorus dominates the reactivity of metal phosphides with lithium, and the number of electrons in the anion dominates the capacities. The Na storage mechanism of metal phosphides remains poorly understood and needs further investigations.

The conductive polymer network in the encapsulating shell may be an electron-conducting cross-linked or network polymer containing chains of a conjugated polymer selected from Polyacetylene, Polythiophene, Poly(3-alkylthiophenes), Polypyrrole, Polyaniline, Poly(isothianaphthene), Poly(3,4-ethylenedioxythiophene) (PEDOT), alkoxy-substituted Poly(p-phenylene vinylene), Poly(2,5-bis(cholestanoxy) phenylene vinylene), Poly(p-phenylene vinylene), Poly (2,5-dialkoxy) paraphenylene vinylene, Poly[(1,4-phenylene-1,2-diphenylvinylene)], Poly(3',7'-dimethyloctyloxy phenylene vinylene), Polyparaphenylene, Polyparaphenylene, Polyparaphenylene sulfide, Polyheptadiyne, Poly(3-hexylthiophene), Poly(3-octylthiophene), Poly(3-cyclohexylthiophene), Poly(3-methyl-4-cyclohexylthiophene), Poly(2,5-dialkoxy-1,4-phenyleneethynylene), Poly(2-decyloxy-1,4-phenylene), Poly(9,9-dioctylfluorene), Polyquinoline, a derivative thereof, a copolymer thereof, or a combination thereof.

The conductive polymer in the encapsulating shell may be an ion-conducting polymer network comprising chains of a lithium ion-conducting or sodium ion-conducting polymer selected from poly(ethylene oxide), polypropylene oxide, poly(ethylene glycol), poly(acrylonitrile), poly(methyl methacrylate), poly(vinylidene fluoride), poly bis-methoxy ethoxyethoxide-phosphazenex, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol) methyl ether acrylate, a sulfonated derivative thereof, or a combination thereof. The ion conductivity of these polymers can be from $10^{-8}$ S/cm to $10^{-2}$ S/cm (more typically from $10^{-5}$ S/cm to $10^{-3}$ S/cm).

The encapsulating shell can seal the encapsulated core structure, preventing direct contact between phosphorus particles in the core and the liquid electrolyte solvent in a lithium-ion cell. Such a contact could induce repeated formation and destruction of solid-electrolyte interface (SEI), leading to rapid and continuing capacity decay.

Graphene, as a two-dimensional carbon material, exhibits high conductivity, high surface area (theoretically 2630 m$^2$/g), high degree of mechanical flexibility (due to its thinness), and high mechanical strength. These outstanding properties can impart a good interfacial contact ability to anchor and disperse phosphorus particles very uniformly on graphene surfaces. These characteristics can effectively restrain the aggregation and sintering of phosphorus particles due to volume changes during battery charge/discharge cycling.

Figure 4:
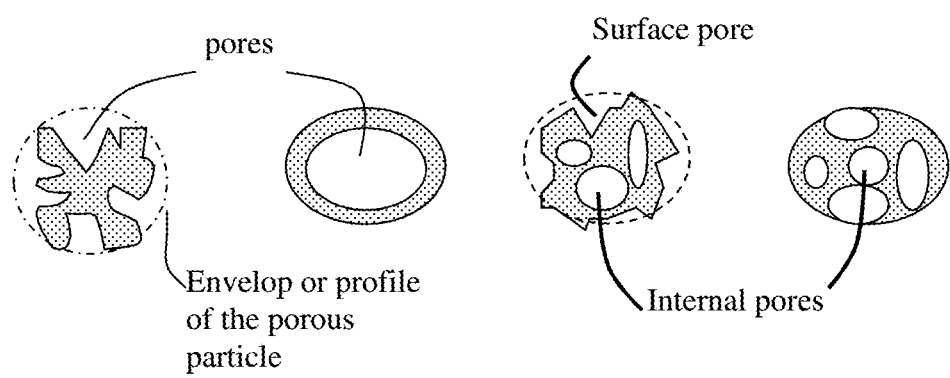
FIG. 4 Some examples of porous primary particles of a phosphorus material.

The primary anode material particles (P) may be a solid, non-porous material or may be intrinsically porous. The porous primary particles contain a pore volume Vpp and solid volume $V_1$, wherein the primary pore volume Vpp is not part of (but being additional to) the core pore volume Vc, and $V_2$=Vpp+Vc. The encapsulating shell has a thickness from 1 nm to 10 μm (preferably from 1 nm to 100 nm). The pores in the core have a total volume $V_2$, wherein the pore-to-active material ratio ($V_2/V_1$ ratio) is preferably and typically from 0.5/1.0 to 5/1.0 (more preferably from 1.0/1.0 to 3.0/1.0). The pores in the particulate can accommodate the volume expansion of the phosphorus material when the battery is charged. Some pores in or on primary particles are schematically illustrated in FIG. 4.

In addition, to create pores in the core of a secondary particle (particulate), one may introduce a sacrificial material (e.g. sugar, salt, polymer, etc.) in the core and then removing the sacrificial material (e.g. dissolving salt or sugar with water or carbonizing sugar or polymer) after the particulate is formed.

The phosphorus material may be in a form of minute solid or porous particles (primary anode material particles) or coating having a diameter or thickness from 0.5 nm to 2 μm (preferably from 1 nm to 100 nm) that is deposited on or bonded to surfaces of internal graphene sheets, CNTs, CNFs, or expanded graphite flakes.

Preferably, the core structure also contains a conjugated polymer selected from Polyacetylene, Polythiophene, Poly (3-alkylthiophenes), Polypyrrole, Polyaniline, Poly(isothianaphthene), Poly(3,4-ethylenedioxythiophene) (PEDOT), alkoxy-substituted Poly(p-phenylene vinylene), Poly(2,5-bis(cholestanoxy) phenylene vinylene), Poly(p-phenylene vinylene), Poly(2,5-dialkoxy) paraphenylene vinylene, Poly [(1,4-phenylene-1,2-diphenylvinylene)], Poly(3',7'-dimethyloctyloxy phenylene vinylene), Polyparaphenylene, Polyparaphenylene, Polyparaphenylene sulfide, Polyheptadiyne, Poly(3-hexylthiophene), Poly(3-octylthiophene), Poly(3-cyclohexylthiophene), Poly(3-methyl-4-cyclohexylthiophene), Poly(2,5-dialkoxy-1,4-phenyleneethynylene), Poly(2-decyloxy-1,4-phenylene), Poly(9,9-dioctylfluorene), Polyquinoline, a derivative thereof, a copolymer thereof, or a combination thereof. This conjugate polymer may be linear, branched, or cross-linked (network). This conjugate polymer, if a crosslinked network, may be the same as or different from the network polymer in the encapsulating shell in terms of chemical composition.

The encapsulating shell may further contain graphene sheets dispersed therein. Preferably, the encapsulating shell has a thickness from 1 nm to 10 μm (preferably less than 1 μm and most preferably <100 nm), and a lithium ion conductivity from $10^{-8}$ S/cm to $10^{-2}$ S/cm (more typically from $10^{-5}$ S/cm to $10^{-3}$ S/cm). The encapsulating shell preferably has an electrical conductivity from $10^{-7}$ S/cm to 3,000 S/cm, up to 20,000 S/cm (more typically from $10^{-4}$ S/cm to 1000 S/cm) when measured at room temperature on a separate cast thin film 20 μm thick.

A single or a plurality of solid or porous primary P particles may be deposited onto surfaces of graphene sheets, CNTs, expanded graphite flakes, etc. (with or without the use of an adhesive or binder). The procedure of depositing phosphorus material onto surfaces of these graphitic materials may be selected from physical vapor deposition, chemical vapor deposition, sputtering, plasma-enhanced deposition, solution phase deposition, chemical deposition, electrochemical deposition, thermal spraying, ultrasonic spraying, electrostatic deposition, electrophoretic deposition, laser ablation deposition, or a combination thereof. Such deposition may be simply accomplished via, for instance, mechanical impacting or ball milling. Primary P particles (including phosphorene platelets) and its binder or matrix resin may be applied to the surfaces of graphene sheets using a broad array of known techniques, such as spray drying, fluidized bed coating, and other micro-encapsulating procedures.

The primary P particles themselves may be porous having porosity in the form of surface pores and/or internal pores. FIG. 4 shows some examples of porous primary P particles. These pores of the primary particles allow the particle to expand into the free space without a significant overall volume increase of the particulate and without inducing any significant volume expansion of the entire anode electrode.

This amount of pore volume inside the particulate (including surface or internal pores of porous primary anode particles) provides empty space to accommodate the volume expansion of the anode active material so that the thin encapsulating layer would not significantly expand (not to exceed 50% volume expansion of the particulate) when the lithium or sodium ion battery is charged. Preferably, the particulate does not increase its volume by more than 20%, further preferably less than 10% and most preferably by approximately 0% when the battery is charged. Such a constrained volume expansion of the particulate would not only reduce or eliminate the volume expansion of the anode electrode but also reduce or eliminate the issue of repeated formation and destruction of a solid-electrolyte interface (SEI) phase. We have discovered that this strategy surprisingly results in significantly reduced battery capacity decay rate and dramatically increased charge/discharge cycle numbers. These results are unexpected and highly significant with great utility value.

Further preferably, the conducting polymer gel network comprises a polyaniline network, polypyrrole network, or polythiophene network. Such a conducting polymer network is typically a lightly crosslinked polymer, capable of elastically deforming to a significant extent (typically at least >10% and can be higher than 50% under tension). Elastic deformation means that the deformation is reversible.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber. In other words, graphene planes (hexagonal lattice structure of carbon atoms) constitute a significant portion of a graphite particle.

A graphene sheet or nano graphene platelet (NGP) is essentially composed of a sheet of graphene plane or multiple sheets of graphene plane stacked and bonded together (typically, on an average, less than 10 sheets per multi-layer platelet). Each graphene plane, also referred to as a graphene sheet or a hexagonal basal plane, comprises a two-dimensional hexagonal structure of carbon atoms. Each platelet has a length and a width parallel to the graphene plane and a thickness orthogonal to the graphene plane. A single-sheet graphene is as thin as 0.34 nm. A few-layer graphene sheet contains 2-10 graphene planes stacked together. The length and width of a NGP are typically between 200 nm and 20 μm, but could be longer or shorter, depending upon the sizes of source graphite material particles.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004) (U.S. Pat. Pub. No. 2005/0271574 now abandoned); and (3) B. Z. Jang, A. Zhamu, and J. Guo, "Process for Producing Nano-scaled Platelets and Nanocomposites," U.S. patent application Ser. No. 11/509,424 (Aug. 25, 2006) (U.S. Pat. Pub. No. 2008/0048152 now abandoned).

Figure 3:
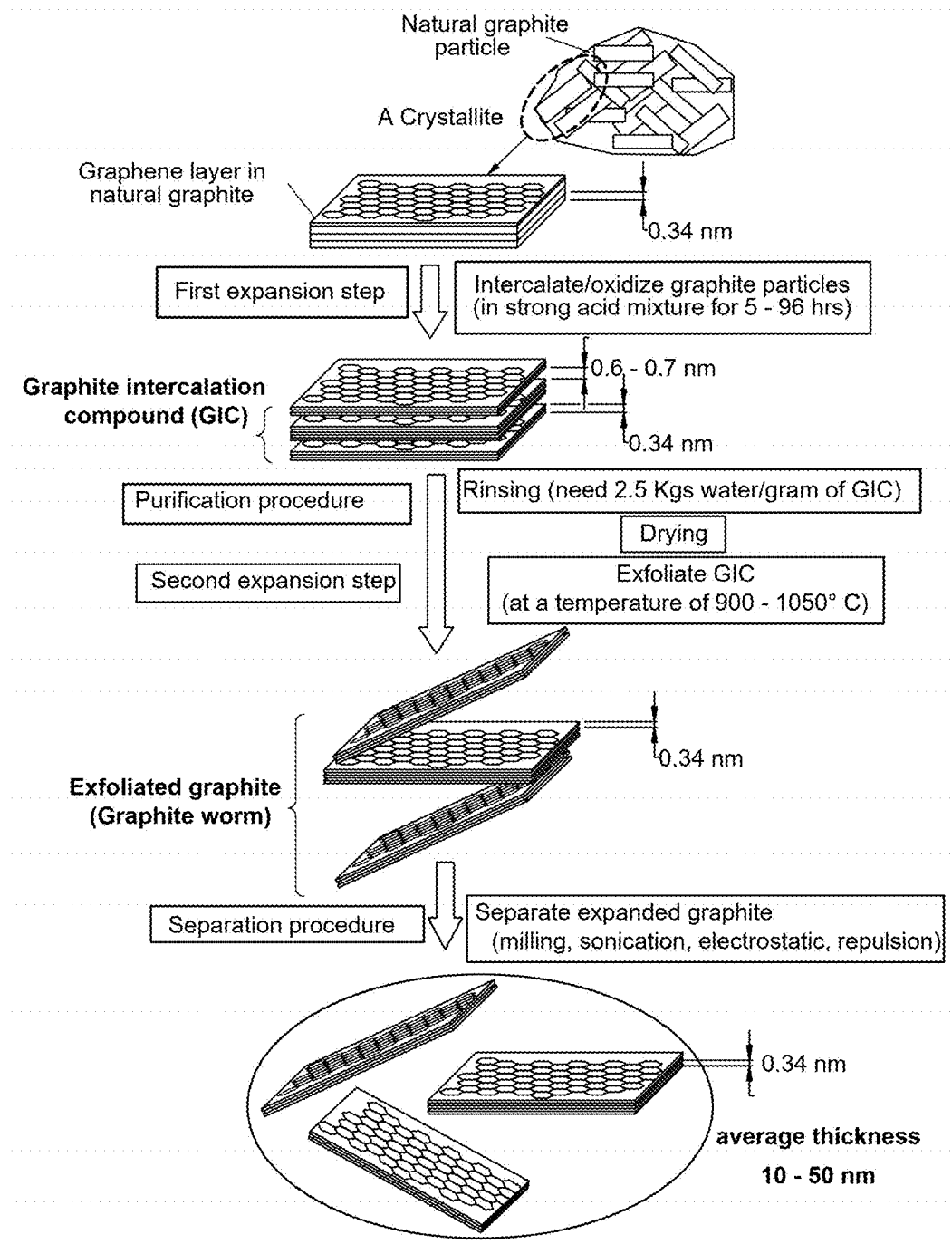
FIG. 3 A flow chart showing the most commonly used prior art process of producing graphene sheets (or nano graphene platelets, NGPs) that entails chemical oxidation/intercalation, rinsing, and high-temperature exfoliation procedures.

A highly useful approach (FIG. 3) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d=\frac{1}{2}d_{002}=0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

It may be noted that if natural graphite powder is dispersed in an oxidant (e.g., a mixture of concentrated sulfuric acid and nitric acid or potassium permanganate) for a sufficient period of time one can obtain a GO material having an oxygen content greater than 30% by weight (preferably >35%), which can be formed into a GO gel state via water rinsing and mechanical shearing.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

In the aforementioned examples, the starting material for the preparation of graphene sheets or NGPs is a graphitic material that may be selected from the group consisting of natural graphite, artificial graphite, graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof.

Graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 4 hours to 5 days). The resulting graphite oxide particles are then rinsed with water several times to adjust the pH values to typically 2-5. The resulting suspension of graphite oxide particles dispersed in water is then subjected to ultrasonication to produce a dispersion of separate graphene oxide sheets dispersed in water. A small amount of reducing agent (e.g. $Na_4B$) may be added to obtain reduced graphene oxide (RGO) sheets.

In order to reduce the time required to produce a precursor solution or suspension, one may choose to oxidize the graphite to some extent for a shorter period of time (e.g., 30 minutes-4 hours) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. Either the already separated graphene sheets (after mechanical shearing) or the un-broken graphite worms or individual graphite flakes are then re-dispersed in water, acid, or organic solvent and ultrasonicated to obtain a graphene dispersion.

The pristine graphene material is preferably produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication to obtain a graphene dispersion.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce a graphene dispersion of separated graphene sheets (non-oxidized NGPs) dispersed in a liquid medium (e.g. water, alcohol, or organic solvent).

Graphene materials can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS). When the oxygen content of graphene oxide exceeds 30% by weight (more typically when >35%), the GO molecules dispersed or dissolved in water for a GO gel state.

The laminar graphite materials used in the prior art processes for the production of the GIC, graphite oxide, and subsequently made exfoliated graphite, flexible graphite sheets, and graphene platelets were, in most cases, natural graphite. However, the present disclosure is not limited to natural graphite. The starting material may be selected from the group consisting of natural graphite, artificial graphite (e.g., highly oriented pyrolytic graphite, HOPG), graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$, only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual single graphene layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium to produce graphene fluoride sheets dispersed in the liquid medium. The resulting dispersion can be directly used in the graphene deposition of polymer component surfaces.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

For the purpose of defining the claims of the instant application, NGPs or graphene materials include discrete sheets/platelets of single-layer and multi-layer (typically less than 10 layers, the few-layer graphene) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials. The presently disclosed graphene can contain pristine or non-pristine graphene and the disclosed method allows for this flexibility. These graphene sheets all can be chemically functionalized.

FIG. 2(B) schematically illustrates the core-shell particulate, according to some embodiments of the disclosure. This particulate structure may be produced by the processes schematically shown in FIG. 2(A).

Figure 2A:
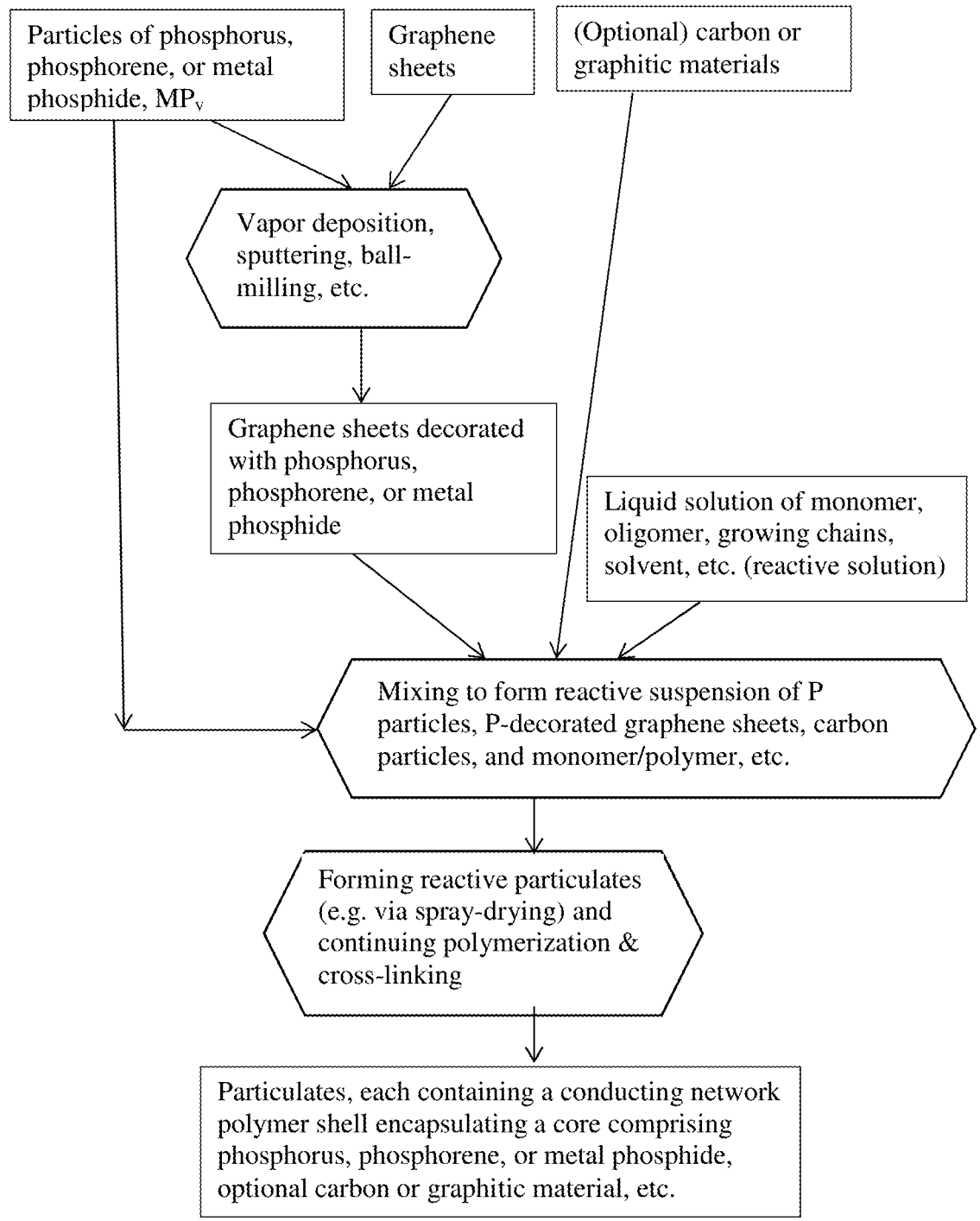
FIG. 2(A) A diagram showing the presently disclosed process for producing core-shell particulates, wherein the particulate comprises a conducting network polymer-based encapsulating shell and a core comprising phosphorus material, according to some embodiments of instant disclosure.
Figure 2B:
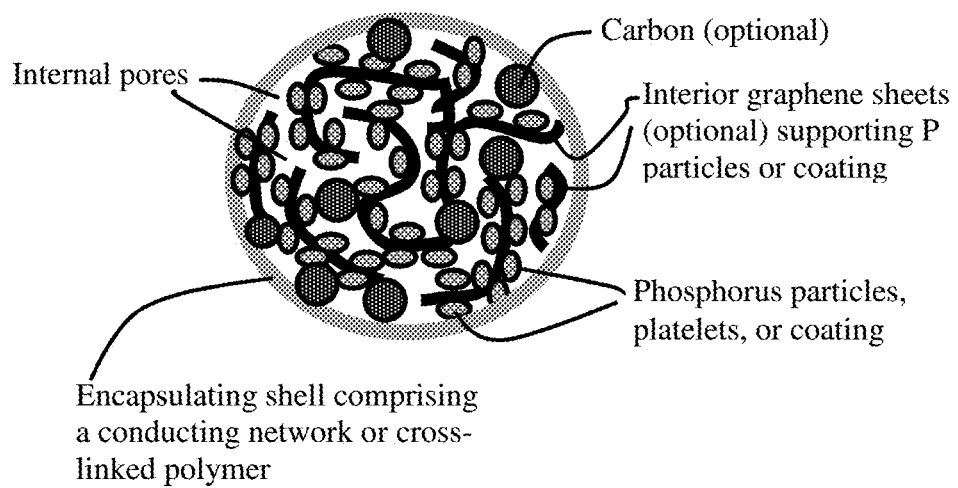
FIG. 2(B) Schematic drawing illustrating the core-shell particulate, according to some embodiments of the disclosure.

In some embodiments, as shown in FIG. 2(A), a process may begin with depositing particles or coating of phosphorus, phosphorene, or metal phosphide, $MP_y$, onto surfaces of multiple graphene sheets (pristine graphene, GO, RGO, fluorinated graphene, etc.) using CVD, plasma-enhanced CVD, physical vapor deposition, sputtering, solution deposition, melt impregnation, chemical reaction deposition, etc. The resulting phosphorus-decorated graphene sheets or isolated phosphorus particles, along with a conductive material (e.g. carbon particles, carbon nanotubes, carbon nano-fibers, graphene sheets, etc.), are then dispersed in a reactive liquid medium to form a suspension. This procedure is followed by forming the suspension into secondary particles or particulates (using spray-drying or other known secondary particle forming procedures) in such a manner that the particulate comprises a core-shell structure having a core of particles of the phosphorus material, optional internal graphene sheets, optional particles of a carbon material (conductive additive), and a shell comprising reacting polymer chains embracing the core. Heat and/or UV may be applied to accelerate the cross-linking process to form the final network polymer that encapsulates the core.

In certain preferred embodiments, the process further comprises thermally vaporizing or heating the phosphorus material and re-distributing the phosphorus material vapor in the core, cooling and making the vapor to deposit as a coating or nano particles of the phosphorus material onto surfaces of the internal graphene sheets. Such a procedure enables the conversion of micron- or sub-micron particles (e.g. 0.1 µm to 10 µm) of a phosphorus material in situ into a large number of ultra-fine particles (0.5-100 nm in diameter) or ultra-thin coating (1-100 nm) deposited on graphene surfaces.

All types of porous anode active material particles may be produced by depositing the anode active material onto surfaces or into pores of a sacrificial material structure, followed by removing the sacrificial material. Such a deposition can be conducted using CVD, plasma-enhanced CVD, physical vapor deposition, sputtering, solution deposition, melt impregnation, chemical reaction deposition, etc.

In some embodiments, prior to the conducting polymer encapsulating process, the primary particles of P material (alone or supported on graphene surfaces) contain P particles that are pre-coated with a coating of a conductive material selected from carbon, pitch, carbonized resin, a conductive polymer, a conductive organic material, a graphene coating (e.g. graphene sheets), a metal coating, a metal oxide shell, or a combination thereof. The coating layer thickness is preferably in the range from 1 nm to 10 µm, preferably from 2 nm to 1 µm, and further preferably from 5 nm to 100 nm. This coating is implemented for the purpose of establishing a stable solid-electrolyte interface (SEI) to increase the useful cycle life of a lithium-ion battery. Coating of graphene sheets on anode active material particles may be accomplished by using a similarly configured impact transfer process (direct transfer or indirect transfer) as described above for the composite particles.

In some embodiments, the particles of solid anode active material (e.g. MPy) contain particles that are, prior to being deposited onto graphene surfaces, pre-coated with a carbon precursor material selected from a coal tar pitch, petroleum pitch, meso-phase pitch, polymer, organic material, or a combination thereof so that the carbon precursor material resides between surfaces of the solid phosphorus material particles and the graphene sheets, and the method further contains a step of heat-treating the graphene-embraced anode material-decorated graphene sheets to convert the carbon precursor material to a carbon material coated on primary active material particle surfaces.

There are three broad categories of micro-encapsulation methods that can be implemented to produce particulates of conducting network polymer shell-encapsulated core comprising a phosphorus material in the form of nanoparticles, platelets, or coating (coating being supported by the internal graphene sheets or in physical contact thereof). These include physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

Pan-coating method: The pan coating process involves tumbling a mixture of graphene sheets, particles of a phosphorus material, and an optional conductive additive in a pan or a similar device while the encapsulating material (e.g. graphene sheets dispersed in a monomer/oligomer, polymer melt, polymer/solvent solution) is applied slowly until a desired encapsulating shell thickness is attained. This monomer, Oligomer or polymer can be a precursor to a conducting polymer network.

Air-suspension coating method: In the air suspension coating process, the particles of a phosphorus material (supported or unsupported by a graphitic material, such as graphene sheets), and an optional conductive additive are dispersed into the supporting air stream in an encapsulating chamber. A controlled stream of a polymer-solvent solution (e.g. polymer or its monomer or oligomer dissolved in a solvent; or its monomer or oligomer alone in a liquid state) is concurrently introduced into this chamber, allowing the solution to hit and coat the suspended particles of a phosphorus material and an optional conductive additive. These suspended species are encapsulated (fully coated) with or dispersed in a polymer or reactive precursor (monomer, oligomer, etc. which is polymerized/cured concurrently or subsequently) while the volatile solvent is removed. This process may be repeated several times until the required parameters, such as full-coating thickness (i.e. encapsulating shell or wall thickness), are achieved. The air stream which supports the anode particles also helps to dry them, and the rate of drying is directly proportional to the temperature of the air stream, which can be adjusted for optimized shell thickness.

In a preferred mode, the anode particles in the encapsulating zone portion may be subjected to re-circulation for repeated coating. Preferably, the encapsulating chamber is arranged such that the nanowires pass upwards through the encapsulating zone, then are dispersed into slower moving air and sink back to the base of the encapsulating chamber, enabling repeated passes of the nanowires through the encapsulating zone until the desired encapsulating shell thickness is achieved.

Centrifugal extrusion: Particles of a phosphorus material (supported or unsupported by a graphitic material, such as graphene sheets) and an optional conductive additive may be encapsulated with a polymer or precursor material using a rotating extrusion head containing concentric nozzles. In this process, a stream of core fluid (slurry containing anode particles, etc. dispersed in a solvent) is surrounded by a sheath of shell solution or melt containing the polymer or precursor. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational nozzle encapsulation method: Core-shell encapsulation or matrix-encapsulation of particles of a phosphorus material (supported or unsupported by a graphitic material, such as graphene sheets) can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the anode active material nanowires and the polymer or precursor. The solidification can be done according to the used gelation system with an internal gelation.

Spray-drying: Spray drying may be used to encapsulate particles of a phosphorus material (supported or unsupported by a graphitic material, such as graphene sheets) when the particles are suspended in a melt or polymer/precursor solution to form a suspension. In spray drying, the liquid feed (solution or suspension) is atomized to form droplets which, upon contact with hot gas, allow solvent to get vaporized and thin polymer shell or matrix to fully embrace the particles. If pre-made graphene sheets are included in the suspension, the micro-droplets formed may contain graphene sheets in the matrix of the composite particulates.

Coacervation-phase separation: This process consists of three steps carried out under continuous agitation:
(a) Formation of three immiscible chemical phases: liquid manufacturing vehicle phase, core material phase and encapsulation material phase. The anode particles are dispersed in a solution of the encapsulating polymer or precursor. The encapsulating material phase, which is an immiscible polymer in liquid state, is formed by (i) changing temperature in polymer solution, (ii) addition of salt, (iii) addition of non-solvent, or (iv) addition of an incompatible polymer in the polymer solution.
(b) Deposition of encapsulation shell material: anode particles being dispersed in the encapsulating polymer solution, encapsulating polymer/precursor coated around anode nanowires, and deposition of liquid polymer embracing around anode particles by polymer adsorbed at the interface formed between core material and vehicle phase; and
(c) Hardening of encapsulating shell material: shell material being immiscible in vehicle phase and made rigid via thermal, cross-linking, or dissolution techniques.

In-situ polymerization: In some micro-encapsulation processes, anode particles are fully coated with a monomer or oligomer first. Then, direct polymerization of the monomer or oligomer is carried out on the surfaces of these particles.

Matrix polymerization: This method involves dispersing and embedding anode particles in a polymeric matrix during formation of the particulates. This can be accomplished via spray-drying, in which the particulates are formed by evaporation of the solvent from the matrix material. Another possible route is the notion that the solidification of the matrix is caused by a chemical change.

The following examples serve to provide the best modes of practice for the present disclosure and should not be construed as limiting the scope of the disclosure:

Example 1: Production of
PEDOT:PSS-Encapsulated Phosphorus Particles for Use as an Anode Material for Sodium-Ion Cells Poly(3,4-ethylenedioxythiophene):polystyrene sulfonate (PEDOT:PSS) is a polymer mixture of two ionomers. One component is made up of sodium polystyrene sulfonate, which is a sulfonated polystyrene. Part of the sulfonyl groups are deprotonated and carry a negative charge. The other component poly(3,4-ethylenedioxythiophene) or PEDOT is a conjugated polymer, polythiophene, which carries positive charges. Together the two charged polymers form a macromolecular salt. The PEDOT/PSS is soluble in water.

Phosphorus/carbon (P/C) composite particles enclosed by reduced graphene oxide sheets were prepared by following a procedure proposed by G. H. Lee, et al. [Ref. 6]. In a representative procedure, P/C composite nanoparticles were synthesized by a high energy mechanical milling method. Red phosphorus and Super P (a popular conductive additive used in a lithium-ion battery electrode) at a molar ratio C/P=1/1 was ball-milled for 48 hours in an inert atmosphere. After milling, the resulting black powder was rinsed with $CS_2$ and dried in a vacuum oven.

These carbon/graphene-protected red phosphorus particles were then dispersed in a PEDOT/PSS-water solution to form a slurry (2-8% by wt. solid content), which was spray-dried to form multiple particulate featuring a core shell structure wherein the shell is composed of PEDOT/PSS network polymer and the core is composed of protected red phosphorus particles and 30-65% by volume of pores. The resulting particulate powder mass is herein referred to as Sample 1.

A baseline sample of powder mass, Sample 1-CP, comprises the phosphorus/carbon (P/C) composite particles enclosed by reduced graphene oxide sheets, without the encapsulating network polymer. Approximately 0.5 mg of GO sheets and 0.20 g of the P/C composite was dispersed in 100 mL of deionized water. The suspension was subjected to sonication and vigorous stirring and then spray-dried to obtain particulate powder. After spray-drying, GO-coated P/C composite powder was soaked in 0.01 M of $Cu(NO_3)_2$ solution and reduced with 0.10 g of $NaBH_4$. The resulting composite particulates have an active material (P) content of approximately 22%.

These two types of anode active materials were incorporated as an anode active material in sodium-ion batteries. Electrochemical characterization was conducted by using CR2032-type coin cell wherein Na metal was used as the counter and reference electrodes. To make slurry, active material (70 wt %), Super P (10 wt %) and PAA binder (20 wt %) were mixed in mortal and then N-methyl-2-pyrrolidone (NMP) was added to regulate the viscosity of slurry. The slurry was casted on Cu foil and dried in a vacuum oven at 150° C. for 10 h. Disc-shape electrodes were punched into 12 mm size. The average loading mass of electrodes was 1.1 mg/cm². Also, 1 M solution of $NaPF_6$ in ethylene carbonate (EC) and diethyl carbonate (DEC) (1:1, v/v) with 5% flouro-ethylene carbonate (FEC) was employed as an electrolyte, and glass fiber fabric was used as a porous separator. The coin cell was fabricated in an Ar-filled glove box. Galvanostatic charge-discharge cycling test was performed between 0.01 and 2 V vs. $Na^+$/Na at various rates or current densities (0.1 to 2 A/g).

Figure 5:
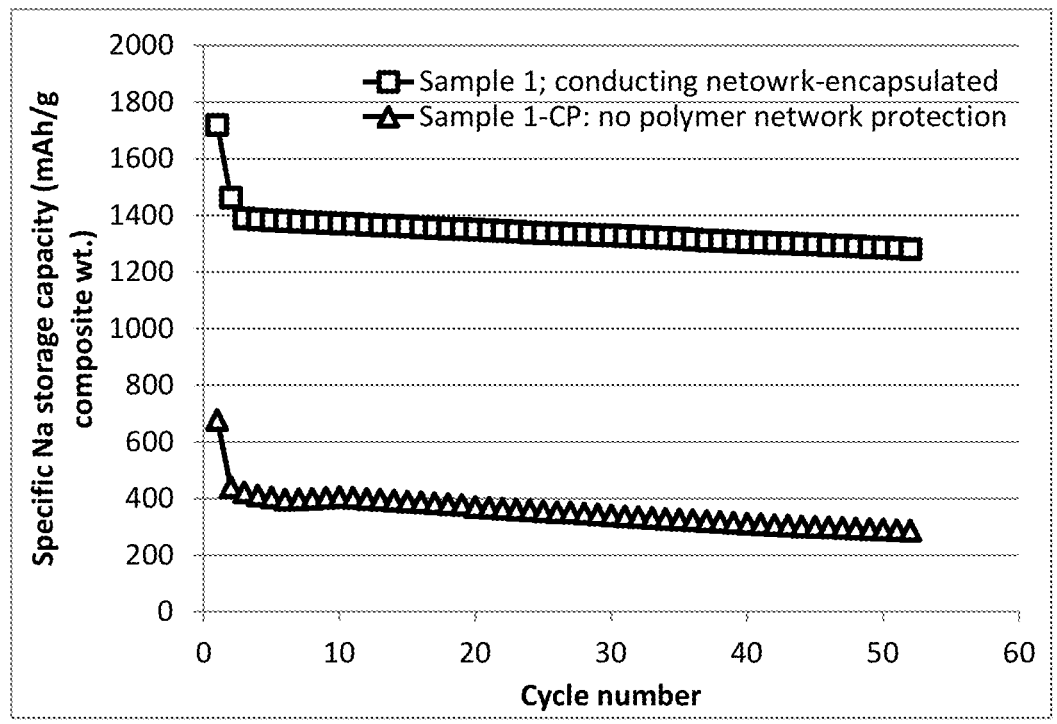
FIG. 5 Two specific sodium ion storage capacity curves (mAh/g-composite) of two anode active materials for sodium-ion cells, one containing a conducting network polymer-based encapsulating shell protecting a P-containing core and the other no network polymer protection.

Shown in FIG. 5 are two specific capacity curves (mAh/g-composite) of Samples 1 and 1-CP, respectively. These data indicate that Sample 1 shows exceptional specific capacity (1718 mAh/g-composite), first-cycle efficiency (85%, excellent value for P-based anode material), and relatively stable cycling behavior. Sample 1-CP, graphene-coated carbon/P composite particulates, exhibit less-than-desirable electrochemical responses.

It may be noted that the specific sodium ion storage capacity values in FIG. 5 are calculated based on the total anode electrode weight (excluding anode current collector and resin binder), not just the phosphorus weight. As opposed to the specific capacity value (mAh/g-phosphorus) calculated based on the phosphorus weight alone, as done in most of the scientific articles [e.g. Ref. 6], the specific capacity based on the total composite weight is significantly more meaningful, particularly when it comes to the calculation of the actual cell specific energy density (Wh/kg). For instance, even though Lee, et al. [Ref. 6] reported a specific capacity as high as 2,250 mAh/g-p (based on the weight of P alone), the P content in the anode structure is only 23.1% and, as such, the actual specific capacity of Lee's anode is 2250×0.231=520 mAh/g-composite. In the entire anode electrode, only 23.1% of the materials used are capable of storing Na ions.

Example 2: Conductive Polymer Network Shell-Encapsulated Core of Red Phosphorus Particles Substantially non-crosslinked Polypyrrole, soluble in chloroform and m-cresol, was chemically synthesized by using ammonium persulfate as an oxidant and dodecylbenzene sulfonic acid as a dopant source. The red phosphorus primary particles were dispersed in a Polypyrrole/chloroform solution, containing no graphene sheets, to form a slurry, which was spray-dried to form core-shell particulates wherein the encapsulating shell is composed of PPy and the core comprises red phosphorus particles. This powder mass is herein designated as Sample 2A.

Another group of samples (Samples 2B) were produced using a different synthetic route, leading to a higher-elasticity PPy network (cross-linked PPy). Polypyrrole hydrogels were first created via a two-reactant, one-pot process. Pyrrole (>97% purity) was dissolved in a solvent of water/ethanol (1:1 by weight) to achieve the first reactant having a concentration of 0.209 mol/L.

Then, as the second reactant, aqueous solutions of ferric nitrate ($Fe(NO_3)_3 \cdot 9H_2O$) and ferric sulfate, respectively, were made at concentrations of 0.5 mol/L. Subsequently, polymerization of the network gels was carried out in an ice bath at 0° C., by mixing volumes of the two reactants at 1:1 molar ratios of pyrrole:ferric salt, to create a reacting mixture with a total of 4 mL. A desired amount of graphene-protected red phosphorus particles were dispersed in this reacting mixture. After rigorously stirring for 1 minutes, the slurry mass was allowed to stand and polymerization and gelation began after 5 minutes. A pyrrole:ferric salt molar ratio of 1:1, which is stoichiometrically deficient of ferric salt, leads to secondary growth (cross-linking) of the polypyrrole network, which could continue from 1 day to 30 days to produce cohesive hydrogels of higher elasticity upon removal of the liquid phase (water and ethanol).

In a separate experiment, additional reactants were added after mixing but prior to gelation. These additional reactants (each referred to as a third reactant), including phytic acid, ferric nitrate, ferric sulfate, potassium hydroxide, and sodium hydrogen carbonate, were separately dissolved in water to form solutions at 1 mmo/L concentration. These reactants were added to separate mixtures of polypyrrole created earlier with ferric nitrate. It was found that the most elastic hydrogels could be obtained at ratios of 1 milli-mole of third reactant-to-1 mole pyrrole. After 30 days, the gels were washed with deionized water until pH neutral to remove any excess $Fe^{3+}$, unreacted pyrrole, $H^+$ ions (produced during polymerization), and unbonded cross-linking chemicals.

Figure 6:
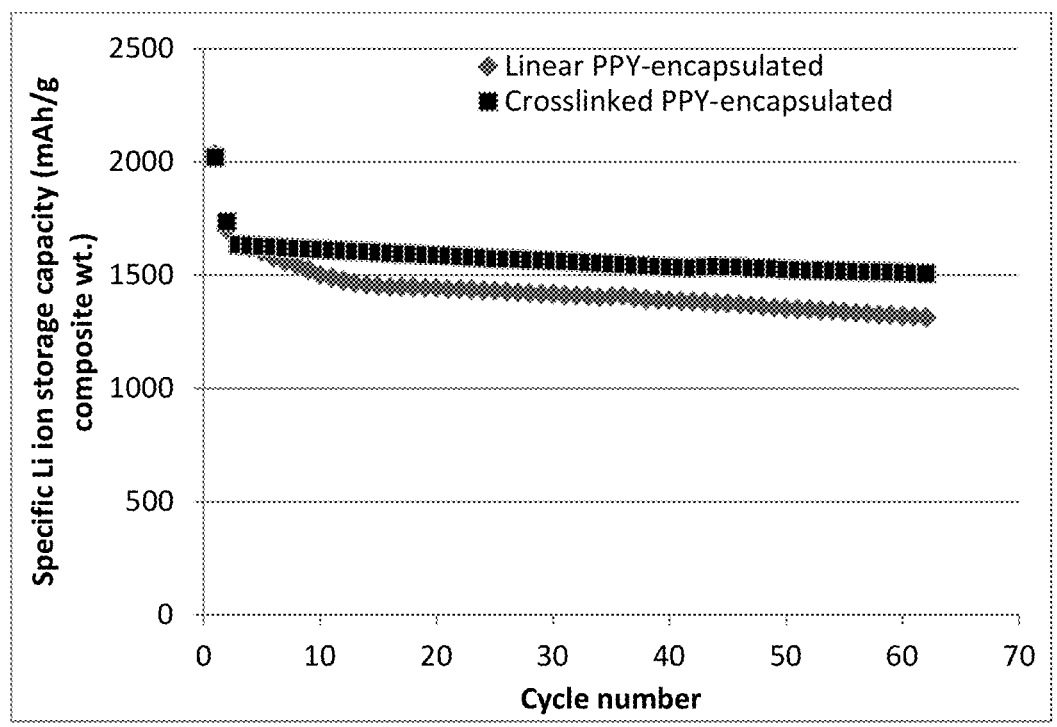
FIG. 6 Two specific lithium ion storage capacity curves (mAh/g-composite) of two anode active material core-shell particulates, one comprising a linear polypyrrole (PPy)-based encapsulating shell and the other comprising a cross-linked (network) PPy-based encapsulating shell.

Powder particulates from both Sample 2A and Sample 2B were made into electrodes of lithium-ion batteries according to a procedure described in Example 6 below. FIG. 6 shows two specific lithium ion storage capacity curves (mAh/g-composite) of two anode active core-shell particulates, one comprising a linear polypyrrole (PPy)-based encapsulating shell and the other comprising a crosslinked (network) PPy-based encapsulating shell. The two samples exhibit similar initial specific lithium ion storage capacity. However, after a few cycles, Sample 2A featuring the linear (non-crosslinked) PPy encapsulation begins to suffer a steeper capacity decay rate. It appears that the linear polymer chains in the encapsulating shell gradually lose their ability to prevent direct contact of liquid electrolyte with P; such a contact would induce repeated formation and destruction of SEI or other undesirable side reactions when the battery is charged and discharged.

Example 3: Production of Polyaniline Gel Network-Encapsulated Phosphorus Material The precursor may contain a monomer, an initiator or catalyst, a crosslinking or gelating agent, an oxidizer and/or dopant. As an example, 3.6 ml aqueous solution A, which contains 400 mM aniline monomer and 120 mM phytic acid, was added and mixed with 280 mg black phosphorus particles. Subsequently, 1.2 ml solution B, containing 500 mM ammonium persulfate, was added into the above mixture and subjected to bath sonication for 1 min. The mixture suspension was spray-dried to form micro-droplets. In about 5 min, the solution changed color from brown to dark green and became viscous and gel-like, indicating in-situ polymerization of aniline monomer to form the PANi hydrogel. The micro-droplets were then vacuum-dried at 50° C. for 24 hours to obtain PANi network polymer-encapsulated phosphorus.

The resulting composite particulates, along with a SBR binder, and Super-P conductive additive were then made into an anode electrode.

Examples 4: Heparin-Based Material as a Curing Agent for the Preparation of a Conducting Polymer Network The encapsulating conducting polymer may be produced from a monomer using heparin-based crosslinking or gelating agent (e.g. in addition to phytic acid). Aqueous solutions of heparin (0.210% w/w) were prepared using 5M NaOH. Photo-cross-linkable heparin methacrylate (Hep-MA) precursors were prepared by combining heparin (porcine source, Mw~1719 kDa) incubated with methacrylic anhydride (MA) and adjusted to pH=8. The degree of substitution (DS) of methacrylate groups covalently linked to heparin precursors was measured by 1H nuclear magnetic resonance. The DS was determined from integral ratios of peaks of the methacrylate groups at 6.2 ppm compared to peak corresponding to methyl groups in heparin at 2.05 ppm.

Solutions used for photopolymerization were incubated with 2-methyl-1-[4-(hydeoxyethoxy)phenyl]-2-methyl-1-propanone (Irgacure 2959) to create final concentrations of 0.5% (w/w) of photoinitiator. Gels were photo-cross-linked using UV illumination for 30-60 min ($\lambda max$=365 nm, 10 mW/cm$^2$). Hep-MA/PANI dual-networks were formed by sequentially incubating cross-linked Hep-MA hydrogels in aqueous solutions of ANI ([ANI]$_0$, between 0.1 and 2 M, 10 min) and acidic solutions of APS ([APS]$_0$, between 12.5 mM and 2 M, 20120 min). The gel fraction of Hep-MA/PANI dual networks was recovered by washing in di H$_2$O after oxidative polymerization. Particles of a phosphorus material could be added into the reacting mass during various stages of reactions, but preferably added right before photopolymerization.

Example 5: Preparation of Polyaniline Network-Encapsulated Graphene Fluoride-Black Phosphorus Platelet Particulates This task began with preparation of graphene fluoride (GF) sheets. In a typical procedure, a powder mass of graphene particulates prepared in Example 1 was fluorinated by vapors of chlorine trifluoride in a sealed autoclave reactor to yield fluorinated graphene hybrid particulates. Different durations of fluorination time were allowed for achieving different degrees of fluorination.

On a separate basis, black phosphorus crystals were prepared from red phosphorus. In a representative procedure, red phosphorus (900 mg), AuSn alloy (360 mg), and SnI$_4$ (18 mg) were first sealed in a quartz ampoule (13 cm in length and 15 mm in diameter) that was evacuated to a pressure lower than 10$^{-3}$ mbar. The sealed ampoule was then placed horizontally in the reaction zone of a tube furnace and heated to 650° C. in 1 h. After exposure to 650° C. for 24 h, the ampoule was cooled to 500° C. at a rate of 30° C./h, and then cooled to room temperature after being held at 500° C. for 30 min. This procedure led to the formation of large BP crystals (about 850 mg) on the cold end of the ampoule. The BP crystals were recovered and washed with toluene to remove the residual mineralizer, followed by water and acetone rinsing.

The liquid phase exfoliation method was then used to exfoliate BP crystals into mono-layer and few-layer BP platelets. This procedure began with grinding the BP crystals to fine powder particles, which were dispersed in deionized water (20 mL) with an initial concentration of 5 mg/mL by tip sonication for 2 hours. After the dispersion had settled for 12 h, the supernatant was decanted and then centrifuged at 1500-5000 rpm for 30 min. Finally, the resulting BP nanosheet dispersion (supernatant) was collected and mixed with graphene fluoride-water suspension (containing some surfactant) for subsequent spray-drying into core-shell particulates. Some of the resulting particulates comprising graphene fluoride (GF)-protected core of phosphorene/GF sheets were used as an anode active material (Sample 5A)

Some of the resulting particulates comprising graphene fluoride (GF)-protected core of phosphorene/GF sheets were subjected to further PANi network encapsulation by following the PANi synthesis and encapsulation procedure described in Example 3.

Figure 7:
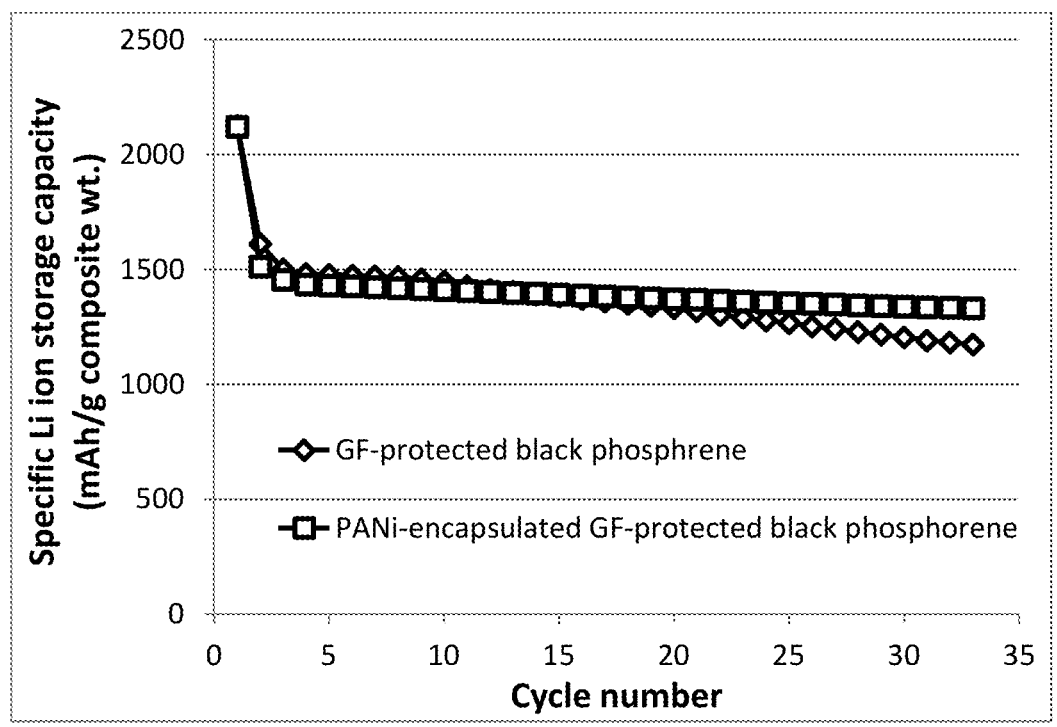
FIG. 7 The specific lithium ion storage capacity curves (mAh/g-composite) of two anode active materials: one sample comprising core-shell particulates comprising graphene fluoride (GF)-encapsulated core of phosphorene/GF sheets and the other comprising a conducting polymer network-encapsulated phosphorene/GF platelets.

The resulting particulates comprising PANi network-encapsulated, graphene fluoride (GF)-protected core of phosphorene/GF sheets were made into anode electrodes by following the procedure described in Example 6. This is herein referred to as Sample 5B. The specific capacity values of the two anodes, using a Li metal disc as a counter electrode, are shown in FIG. 7. These data indicate the superior electrochemical performance of the polymer network-encapsulated graphene-protected core-shell anode materials as compared to the structure without the conducting polymer network encapsulation.

Example 6: Preparation and Electrochemical Testing of Various Battery Cells

For most of the anode active materials investigated, we prepared lithium cells using the conventional slurry coating method. A typical anode composition includes 85 wt. % active material (e.g., the presently disclosed core-shell particulates), 7 wt. % acetylene black (Super-P), and 8 wt. % polyvinylidene fluoride binder (PVDF, 5 wt. % solid content) dissolved in N-methyl-2-pyrrolidinoe (NMP). After coating the slurries on Cu foil, the electrodes were dried at 120° C. in vacuum for 2 h to remove the solvent. Lithium metal disc was used as a counter-electrode. The electrolyte contains 1 M LiPF$_6$ dissolved in a mixture of ethylene carbonate (EC) and diethyl carbonate (DEC) (EC-DEC, 1:1 v/v). An anode layer, separator layer (e.g. Celgard 2400 membrane), and a lithium disc were then laminated together and housed in a coin-cell configuration. The cell assemblies were made in an argon-filled glove-box.

The cyclic voltammetry (CV) measurements were carried out using an Arbin electrochemical workstation at a typical scanning rate of 1 mV/s. In addition, the electrochemical performances of various cells were also evaluated by galvanostatic charge/discharge cycling at a current density of typically from 50 mA/g to 10 A/g. For long-term cycling tests, multi-channel battery testers manufactured by LAND were used.

In lithium-ion battery industry, it is a common practice to define the cycle life of a battery as the number of charge-discharge cycles that the battery suffers 20% decay in capacity based on the initial capacity measured after the required electrochemical formation. In general, we have observed that conducting polymer network encapsulation imparts a significantly higher cycle life to a lithium-ion battery or sodium-ion battery featuring a high-capacity phosphorus-based anode active material. The implementation of internal graphene sheets inside the core to support nano particles or coating of a phosphorus material also significantly enhances the cycling stability of the battery.

The invention claimed is:

1. A conducting polymer network-encapsulated phosphorus anode particulate for a lithium battery or sodium ion battery, said particulate comprising:
    A) a core comprising a phosphorus material in a form of particles or coating having a diameter or thickness from 0.5 nm to 10 μm, selected from red phosphorus, black phosphorus, violet phosphorus, a metal phosphide, MPy, or a combination thereof, wherein M=Se y=from 1 to 4; and
    B) an encapsulating shell that embraces or encapsulates said core, wherein said encapsulating shell comprises an electrically and/or ionically conducting polymer network having a thickness from 0.5 nm to 10 μm.

2. The anode particulate of claim 1, wherein said electrically conducting polymer network comprises a polyaniline hydrogel, polypyrrole hydrogel, or polythiophene hydrogel in a dehydrated state.

3. The anode particulate of claim 1, wherein said core further comprises an electrically and/or ionically conducting polymer network identical to or different from the electrically and/or ionically conducting polymer network in the encapsulating shell.

4. The anode particulate of claim 1, wherein said core or said encapsulating shell further comprises single-layer or few-layer graphene sheets, wherein said few-layer graphene sheets have 2-10 layers of stacked graphene planes having an inter-plane spacing $d_{002}$ from 0.3354 nm to 0.6 nm as measured by X-ray diffraction and said single-layer or few-layer graphene sheets contain a pristine graphene material having essentially zero % of non-carbon elements, or a non-pristine graphene material having 0.001% to 25% by weight of non-carbon elements.

5. The anode particulate of claim 4, wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

6. The anode particulate of claim 1, wherein said core further comprises a single pore or a plurality of pores to accommodate a volume expansion of said phosphorus material when said lithium-ion battery or sodium-ion battery is charged.

7. The anode particulate of claim 6, wherein said phosphorus material inside said core has a volume $V_1$ and said pore or pores have a total volume $V_2$, wherein the $V_2/V_1$ ratio is from 0.5 to 3.5.

8. The anode particulate of claim 1, wherein said core further comprises an electron-conducting material selected from a carbon, pitch, carbonized resin, non-network conductive polymer, conductive organic material, metal, metal oxide, expanded graphite, graphene, or a combination thereof.

9. The anode particulate of claim 1, wherein said core further comprises a lithium or sodium ion-conducting material.

10. The anode particulate of claim 9, wherein said lithium or sodium ion-conducting material is selected from amorphous carbon, an ion-conducting polymer, an ion-conducting polymer gel, an inorganic solid electrolyte, or a combination thereof.

11. The anode particulate of claim 1, wherein said phosphorous material particles are porous having surface pores, internal pores, or both surface and internal pores.

12. The anode particulate of claim 1, wherein said phosphorus material particles include nano particles selected from flakes, beads, pellets, spheres, wires, fibers, filaments, discs, ribbons, or rods, having a diameter or thickness from 1 nm to 100 nm or wherein said phosphorus material coating deposited on surfaces of internal graphene sheets has a thickness from 0.5 nm to 100 nm.

13. The anode particulate of claim 1, wherein said phosphorus material particles comprise phosphorene, which contains mono-layer or few-layer 2D platelets of black phosphorus.

14. A powder mass comprising multiple anode particulates as defined in claim 1.

15. An anode comprising multiple anode particulates as defined in claim 1 as an anode material.

16. A lithium-ion battery comprising the anode of claim 15, a cathode, and an electrolyte.

17. A sodium-ion battery comprising the anode of claim 15, a cathode, and an electrolyte.

18. A process of producing multiple anode particulates of claim 1, the process comprising (A) dispersing multiple particles or coating of the phosphorus material in a reacting mass comprising an oligomer or a monomer, an initiator or catalyst, and a curing or cross-linking agent to form a reacting slurry; (B) forming the reacting slurry into multiple reacting droplets, wherein the droplet comprises one or a plurality of particles of the phosphorus material dispersed in a matrix of polymerizing or cross-linking chains; and (C) converting the polymerizing or cross-linking chains into a network polymer in the droplets to form the anode particulates.

19. The process of claim 18, wherein Step (B) of forming reacting droplets comprises operating a procedure selected from pan-coating, air-suspension coating, centrifugal extrusion, vibration-nozzle encapsulation, spray-drying, coacervation-phase separation, interfacial polycondensation or interfacial cross-linking, in-situ polymerization, matrix polymerization, or a combination thereof.

20. The process of claim 18, wherein said particles or coating of the phosphorus material in step (A) are deposited on surfaces of graphene sheets in a form of phosphorus material-decorated graphene sheets, containing phosphorus particles or coating, phosphorene platelets, or metal phosphide particles or coating bonded on graphene surfaces.

21. The process of claim 20, wherein the procedure of depositing phosphorus material onto graphene surfaces comprises physical vapor deposition, chemical vapor deposition, sputtering, plasma-enhanced deposition, solution phase deposition, chemical deposition, electrochemical deposition, thermal spraying, ultrasonic spraying, electrostatic deposition, electrophoretic deposition, laser ablation deposition, or a combination thereof.

22. A conducting polymer network-encapsulated phosphorus anode particulate for a lithium battery or sodium ion battery, said particulate comprising:
A) a core comprising a phosphorus material in a form of particles or coating having a diameter or thickness from 0.5 nm to 10 μm, selected from red phosphorus, black phosphorus, violet phosphorus, a metal phosphide, MPy, or a combination thereof, wherein M=Mn, V, Se, Mo, Ga, In, or an alloy thereof, and y=from 1 to 4; and
B) an encapsulating shell that embraces or encapsulates said core, wherein said encapsulating shell comprises an electrically and/or ionically conducting polymer network having a thickness from 0.5 nm to 10 μm, wherein said electrically conducting polymer network comprises chains of a conjugated polymer selected from poly(3-alkylthiophenes), poly(isothianaphthene), alkoxy-substituted poly(p-phenylene vinylene), poly(2,5-bis(cholestanoxy) phenylene vinylene), poly(2,5-dialkoxy) paraphenylene vinylene, poly [(1,4-phenylene-1,2-diphenylvinylene)], poly(3',7'-dimethyloctyloxy phenylene vinylene), polyparaphenylene, polyparaphenylene sulfide, polyheptadiyne, poly(3-hexylthiophene), poly(3-octylthiophene), poly(3-cyclohexylthiophene), poly(3-methyl-4-cyclohexylthiophene), poly(2,5-dialkoxy-1,4-phenyleneethynylene), poly(2-decyloxy-1,4-phenylene), poly(9,9-dioctylfluorene), polyquinoline, a derivative thereof, a copolymer thereof, a sulfonated version thereof, or a combination thereof.

23. A conducting polymer network-encapsulated phosphorus anode particulate for a lithium battery or sodium ion battery, said particulate comprising:
A) a core comprising a phosphorus material in a form of particles or coating having a diameter or thickness from 0.5 nm to 10 μm, selected from red phosphorus, black phosphorus, violet phosphorus, a metal phosphide, MPy, or a combination thereof, wherein M=Mn, V, —Se, Mo, Ga, In, or an alloy thereof, and y=from 1 to 4; and
B) an encapsulating shell that embraces or encapsulates said core, wherein said encapsulating shell comprises an electrically and/or ionically conducting polymer network having a thickness from 0.5 nm to 10 μm, wherein said ionically conducting polymer network comprises a polymer gel selected from an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate, a sulfonated derivative thereof, or a combination thereof.

* * * * *